(12) United States Patent
Rengarajan

(10) Patent No.: US 7,099,968 B2
(45) Date of Patent: Aug. 29, 2006

(54) SYSTEM AND METHOD FOR GENERATING BUS REQUESTS IN ADVANCE BASED ON SPECULATION STATES

(75) Inventor: Srikanth Rengarajan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 10/654,544

(22) Filed: Sep. 2, 2003

(65) Prior Publication Data

US 2005/0060452 A1    Mar. 17, 2005

(51) Int. Cl.
    *G06F 13/00*    (2006.01)
(52) U.S. Cl. ............... 710/107; 710/306; 710/313
(58) Field of Classification Search ............... None
    See application file for complete search history.

(56) References Cited

U.S. PATENT DOCUMENTS

| 5,574,868 | A | * | 11/1996 | Marisetty ............... 710/118 |
| 5,933,610 | A | * | 8/1999 | Chambers et al. ........ 711/113 |
| 6,341,334 | B1 | * | 1/2002 | Kamemaru ............... 711/137 |
| 6,393,505 | B1 | * | 5/2002 | Scalise et al. ............ 710/107 |
| 6,487,627 | B1 | * | 11/2002 | Willke et al. ............ 710/306 |
| 6,763,415 | B1 | * | 7/2004 | Tischler ............... 710/240 |
| 2002/0116562 | A1 | * | 8/2002 | Mathuna et al. ........... 710/105 |

OTHER PUBLICATIONS

"Tango: a hardware-based data prefetching technique for superscalar processors"; Pinter, Shlomit and Yoaz, Adi; Microarchitecture 1996. MICRO-29, Proceedings of the 29th Annual IEEE/ACM International Symposium; Dec. 2-4, 1996; pp. 214-225.*

* cited by examiner

*Primary Examiner*—Glenn A. Auve
(74) *Attorney, Agent, or Firm*—Schwegman, Lundberg, Woessner & Kluth, P.A.

(57) ABSTRACT

A system and method predict when to generate a bus request ahead-of-time based on bus-activity, bus-usage efficiency and bus-bandwidth usage. A bus-usage efficiency indicator may be generated by a requester, such as a memory controller, based on a number of unused bus cycles that were granted to the requester during a prior observation window. The bus-bandwidth usage indicator may be generated by the requester based on a number of bus transactions effectively utilized by the requester during the prior observation window. The bus-activity indicator may be received from a bus arbiter to indicate system bus activity during a prior system-bus observation window. When the bus-activity indicator indicates that the system bus is busy, a requestor may transition between a full-speculation state, a delayed speculation state and a no-speculation state based on bus-usage efficiency and bandwidth usage. When the system bus is idle, a requester may remain in the full-speculation state.

30 Claims, 4 Drawing Sheets

SYSTEM AND METHOD FOR GENERATING BUS REQUESTS IN ADVANCE BASED ON SPECULATION STATES

TECHNICAL FIELD

The present invention pertains to electronic systems, and in some embodiments, to processing systems. Embodiments of the present invention also pertain to pipelined systems, to memory controllers, and to wireless communication devices.

BACKGROUND

Processing systems, including pipelined systems, generally utilize an arbiter to arbitrate among the devices requesting access to a shared resource over a system bus. When a requesting device desires access to the shared resource, the requesting device generally generates a request and waits for a grant. One problem with this approach is the latency involved with such requests. This is especially a problem for memory devices, such as memory controllers, because latency and bus-bandwidth limitations may result in delays that impact system-level operations.

Thus there are general needs for systems and methods that help reduce the effects of latency and increase bus-usage efficiency.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
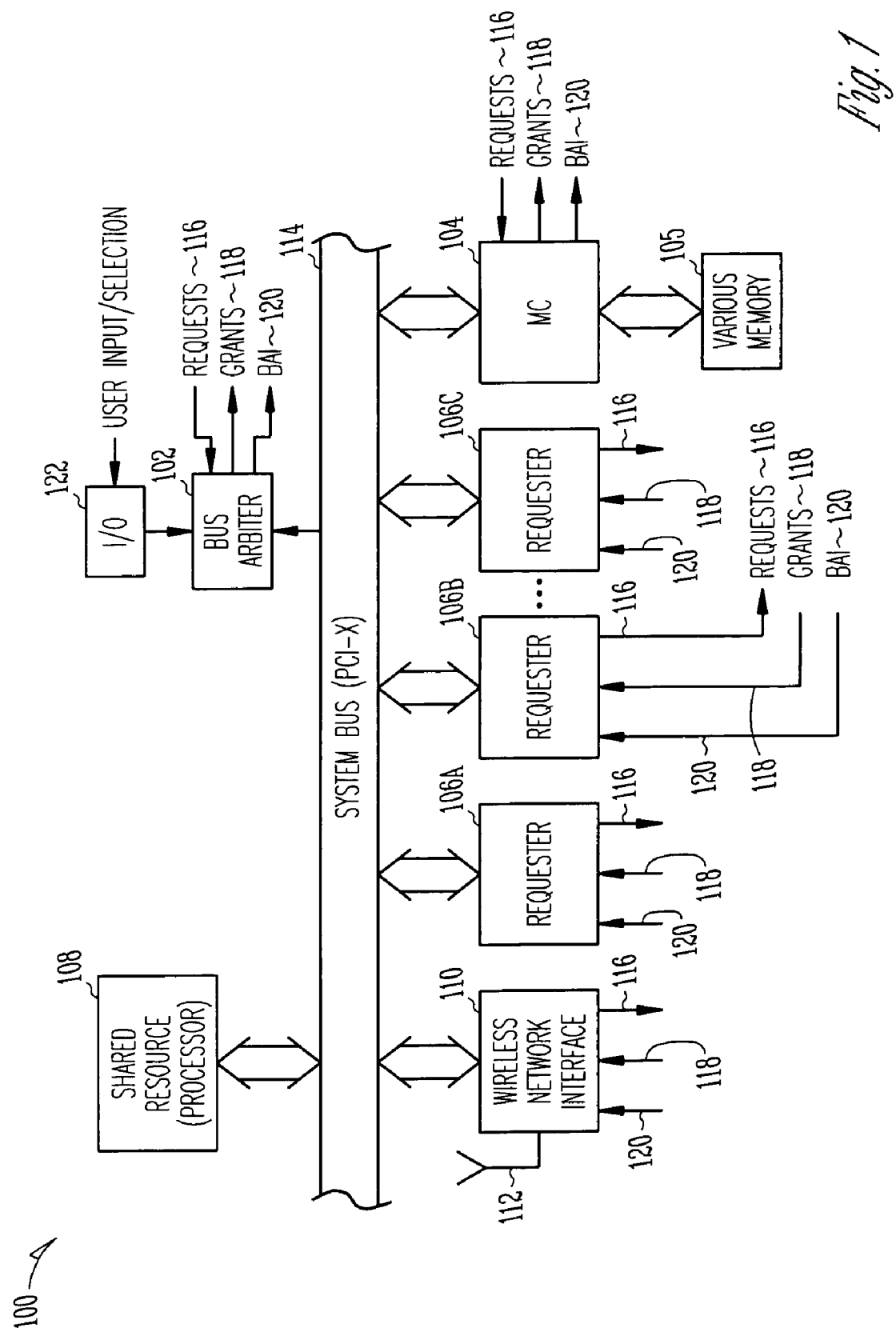
FIG. 1 is a block diagram of a processing system in accordance with some embodiments of the present invention.

FIG. 1 is a block diagram of a processing system in accordance with some embodiments of the present invention. Processing system 100 may be part of almost any computing or processing system including computer systems, server systems, and wireless communication devices and systems. In some embodiments, system 100 may be part of a pipelined system. System 100 comprises bus arbiter 102 which receives requests 116 from a plurality of requestors (i.e., requesting devices), shown generally as requestors 106A, 106B and 106C, requesting use of shared resource 108.

Requestors 106A, 106B and 106C may include any device or element that requests use of a shared resource. Examples of requestors 106A, 106B and 106C may include, for example, memory controllers, processors and processing resources including cryptographic processors, direct memory access (DMA) units, network interfaces, digital signal processors (DSPs), network controllers including wireless local area network controllers, signal processors, floating-point units (FPUs), application accelerators, and/or data acquisition devices. In some embodiments, memory controller (MC) 104 may function as a requestor, such as requestors 106A, 106B and 106C.

Requestors 106A, 106B and 106C generate bus requests 116 for bus arbiter 102 and may receive bus grants 118 from bus arbiter 102. Bus arbiter 102 may provide a bus grant for a request to a requestor in accordance with one or more arbitration schemes, including, for example, priority based arbitration schemes or fixed arbitration schemes. In some embodiments, bus requests 116 and bus grants 118 may be communicated between arbiter 102 and requestors over a grant/request bus (not illustrated).

When granted access, one or more of requestors 106A, 106B and 106C may access one or more of shared resources 108 over system bus 114. Shared resource 108 may include one or more resources that may be shared among requestors 106A, 106B and 106C. Shared resource 108, may include a processor, a central processing unit, a particularly-configured processing engine (e.g., for cryptographic processing), or other resource that may be shared by one or more of requestors 106A, 106B and 106C over bus 114. Bus 114 may be almost any type of data bus that supports multiple clients using some form or arbitration. In some embodiments, bus 114 may be a 32-bit or 64-bit bus including a PCI bus, a PCI-express (PCIX) bus or a third-generation input/output (3GIO) bus, although the scope of the invention is not limited in this respect.

In accordance with some embodiments, bus arbiter 102 generates bus-activity indicator (BAI) 120 for use by one or more of requestors 106A, 106B and 106C. Bus-activity indicator 120 may be an indication of how busy system bus 114 has been during a recent system-bus observation window. The system-bus observation window may comprise a prior predetermined number of system-bus cycles. One or more of requestors may predict when to generate a bus request based on bus-activity indicator 120, a bus-usage efficiency indicator and a bus-bandwidth usage indicator. The bus-usage efficiency indicator may be generated by one of requestors 106A, 106B and 106C based on a number of unused bus cycles that were granted to the requestor during a prior observation window. The bus-bandwidth usage indicator may be generated by the requestor based on a number of bus transactions effectively utilized by the requestor during the prior observation window.

In some embodiments, when bus-activity indicator 120 indicates that system bus 114 is not busy, a requestor, such as one of requestors 106A, 106B and 106C, may engage in full speculation generating a bus request ahead-of-time, which may be a maximum predetermined number of bus cycles ahead-of-time. When bus-activity indicator 120 indicates that the system bus is busy, the requestor may predict how early to generate the bus request based on the bus-activity indicator, the bus-usage efficiency indicator and the bus-bandwidth usage indicator.

In some embodiments, a requestor, such as one of requestors 106A, 106B and 106C, may predict when to generate the bus request based on one of a plurality of speculation states, which may be at least initially determined by bus-activity indicator 120. In these embodiments, the requestor may transition among the various speculation states based on the bus-usage efficiency indicator and the bus-bandwidth usage indicator. In some embodiments, the requestor may transition among the various speculation states based on changes in the bus-usage efficiency indicator and/or bus-bandwidth usage indicator. In some embodiments, the requestor may determine a number of bus cycles to generate the bus request ahead-of-time based on an imminence level of a transaction for which the bus request is to be generated.

In some embodiments, bus-activity indicator 120 may comprises a two-bit value broadcasted by bus arbiter 102 to one or more of requestors 106A, 106B and 106C. The two-bit value may be broadcasted over a two-wireline connection to one or more of requestors 106A, 106B and 106C, although the scope of the invention is not limited in this respect.

In wireless embodiments, system 100 may include wireless network interface 110, such as a network interface card (NIC). In these embodiments, wireless network interface 110 may operate as a requestor, such as one of requestors 106A, 106B and 106C, and may communicate RF signals with other networked devices, such as an access point, using antenna 112. In these embodiments, system 100, including wireless network interface 110 and antenna 112, may be part of a wireless communication device, such as a personal digital assistant (PDA), a laptop or portable computer with wireless communication capability, a web tablet, a wireless telephone, a wireless headset, a pager, an instant messaging device, an MP3 player, a digital camera, an access point, or other device that may receive and/or transmit information wirelessly. In these embodiments, wireless network interface 110 may receive RF communications in accordance with specific communication standards, such as the IEEE 802.11(a), 802.11(b) and/or 802.11(g) standards for wireless local area network standards, although wireless network interface 110 may receive communications in accordance with other techniques including Digital Video Broadcasting Terrestrial (DVB-T) broadcasting standard, and the High performance radio Local Area Network (HiperLAN) standard. Antenna 112 may be almost any type of antenna including a dipole antenna, a monopole antenna, a loop antenna, a microstrip antenna or other type of antenna suitable for reception and/or transmission of RF signals, which may be processed by wireless network interface 110.

Although system 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, generating, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Figure 2:
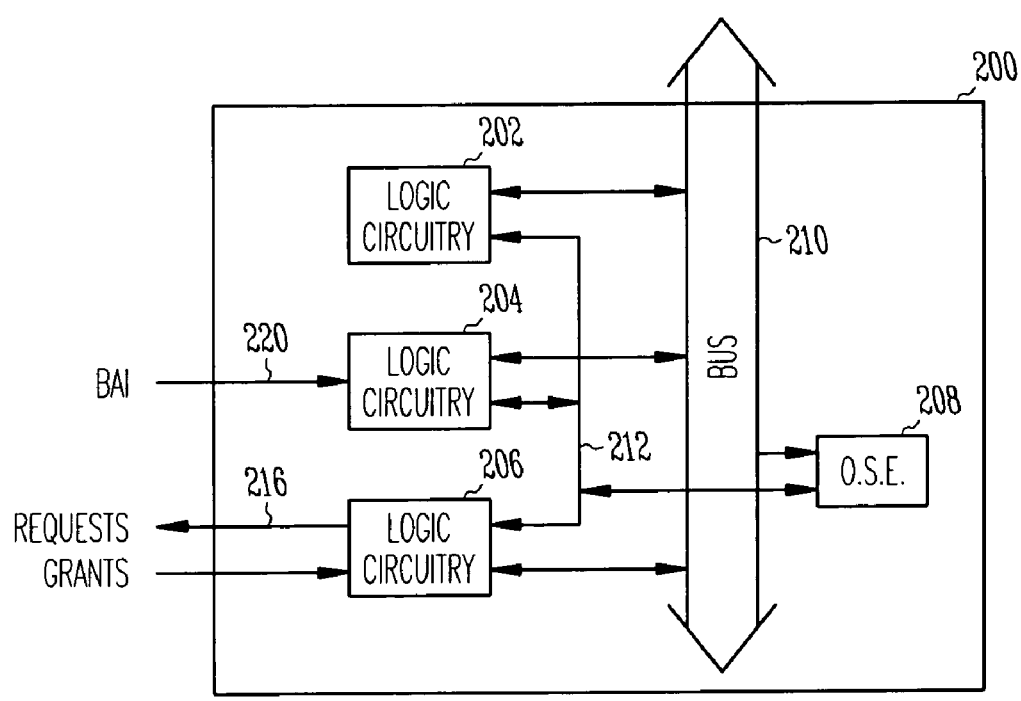
FIG. 2 is a block diagram of a requester in accordance with some embodiments of the present invention.

FIG. 2 is a block diagram of a requestor in accordance with some embodiments of the present invention. Requestor 200 may be suitable for use as one of requestors 106A, 106B and 106C (FIG. 1) although other requestors may also be suitable. Requestor 200 comprises logic circuitry 202 to generate a bus-usage efficiency indicator and a bus-bandwidth usage indicator, and logic circuitry 204 to predict when to generate a bus request based on the bus-usage efficiency indicator and the bus-bandwidth usage indicator. Requestor 200 may also include other system elements 208 to allow requestor 200 to serve its primary purpose (e.g., as a memory controller or memory-control unit (MCU), a processor or processing resource, a direct memory access (DMA) unit, or a network interface). Requestor 200 may also include one or more internal communications paths 210 and/or 212 too provide internal communications between elements, as well as communications with external elements, such as a system bus.

In some embodiments, logic circuitry 202 may generate the bus-usage efficiency indicator based on unused bus cycles that were granted to the requester 200 during a prior observation window, and may generate the bus-bandwidth usage indicator based on a number of bus transactions effectively utilized by the requester 200 during the prior observation window.

Requestor 200 may also include logic circuitry 206 to generate the bus request ahead-of-time based on a prediction received from logic circuitry 204. In some embodiments, logic circuitry 204 may receive bus-activity indicator (BAI) 220 from a bus arbiter indicating system bus activity during a prior system-bus observation window. In embodiments, bus-activity indicator 220 may correspond to bus-activity indicator 120 (FIG. 1). Logic circuitry 204 may predict when to instruct logic circuitry 206 to generate bus request 216 ahead-of-time based on bus-activity indicator 220.

In some embodiments, when bus-activity indicator 220 indicates that the system bus is not busy, requestor 200 may engage in full speculation generating bus request 216 ahead-of-time at a maximum predetermined number of bus cycles. In some embodiments, when bus-activity indicator 220 indicates that the system bus is busy, logic circuitry 204 may predict how early to generate the bus request based on bus-activity indicator 220, the bus-usage efficiency indicator and the bus-bandwidth usage indicator. In some embodiments, logic circuitry 204 may predict when to generate bus request 216 based on one of a plurality of speculation states, which may be at least initially determined by bus-activity indicator 220. Requestor 200 may transition among the speculation states based on the bus-usage efficiency indicator and the bus-bandwidth usage indicator, for example, as the bus-usage efficiency indicator and/or bus-bandwidth usage indicator may change. In some embodiments, logic circuitry 204 may determine the number of bus cycles to generate the bus request ahead-of-time based on an imminence level of a transaction for which the bus request is to be generated.

In some embodiments in which requester 200 comprises a memory controller, such as memory controller 104 (FIG. 1), OSE 208 may include a four-entry buffer to enable pipelining. Memory controller 104 (FIG. 1) may be coupled to various memories 105 (FIG. 1) to facilitate and control the transfer of data between various memories 105 (FIG. 1) and shared resources 108. In these embodiments, memories 105 (FIG. 1) may include almost any type of memory of data storage element, including synchronous memory and SDRAM. In some embodiments, memories 105 (FIG. 1), or at least portions thereof, may include almost any storage medium, such as, but not limited to, any type of disk including floppy disks, optical disks, CD-ROMS, magnetic-optical disks, read-only memories (ROMs), random access memories (RAMs), electrically programmable read-only memories (EPROMs), electrically erasable and programmable read-only memories (EEPROMs), magnetic or optical cards, or any other type of media suitable for storing information and being coupled to a communication interconnect such as a bus through a memory controller. In embodiments that use a four-entry buffer, the number of entries that are currently occupied in the four-entry buffer may be factored in making the prediction.

Although requestor 200 is illustrated as having several separate functional elements (e.g., logic circuitry 202, 204 and 206, and OSEs 208), one or more of these functional elements may be combined in a single hardware element. In some embodiments, one or more these elements and may be implemented by combinations of software-configured elements, such as processing elements and/or other hardware elements and firmware.

Figure 3:
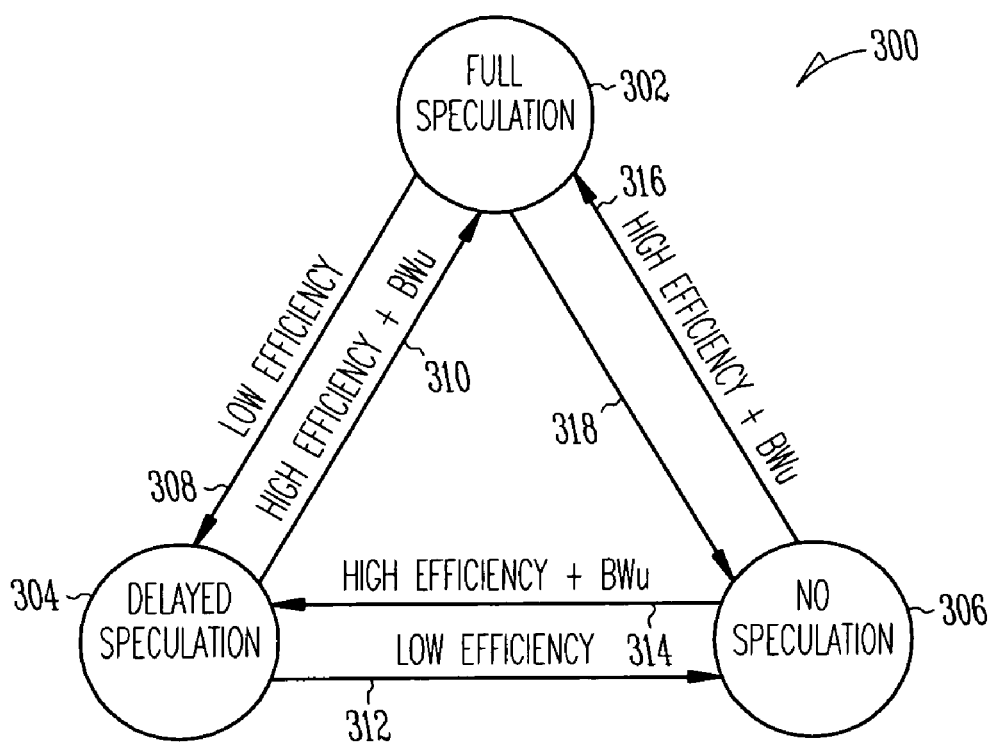
FIG. 3 is state diagram in accordance with some embodiments of the present invention.

FIG. 3 is state diagram in accordance with some embodiments of the present invention. State diagram 300 illustrates speculation states 302, 304 and 306 in which a requestor, such as one of requestors 106A, 106B and 106C (FIG. 1) may be in when predicting when to generate a bus request. The speculation state may be initially set or determined based on a bus-activity indicator, such as BAI 120 (FIG. 1), received from a bus arbiter. The speculation states may include full-speculation state 302, delayed-speculation state 304 and no-speculation state 306.

In some embodiments, state diagram 300 may be applicable to situations when the bus-activity indicator indicates that the system bus has been busy during the prior observation window. When the bus-activity indicator indicates that the system bus has not been busy, or has been idle, a requester may remain in full-speculation state 302 regardless of the bus-usage efficiency indicator and the bus-bandwidth usage indicator.

When a requester is in full-speculation state 302, the requestor may engage in full speculation and may generate bus requests ahead-of-time at a maximum number of bus cycles. In some embodiments, the number of bus cycles may be a predetermined number of bus cycles, while in other embodiments, the number of bus cycles may be based on the imminence of the request. The number of bus cycles ahead-of-time in which bus requests are generated may also depend on the type of memory being accessed (e.g., whether the memory is synchronous verses asynchronous, or static verses dynamic). The number of bus cycles ahead-of-time in which bus requests are generated may also depend on the width of the data-bus to an external-memory chip (e.g., 8-bit, 16-bit, 32-bit, 64-bit, etc.). The number of bus cycles ahead-of-time in which bus requests are generated may also depend on the size of the data being fetched (e.g., 1-byte, 6-bytes, 32-bytes, 1K-bytes, 1M-bytes, etc.).

When a requester is in delayed-speculation state 304, the requestor may engage in a delayed speculation and may also generate bus requests a number of bus cycles ahead-of-time. In delayed-speculation state 304, however, the number of bus cycles ahead-of-time in which bus requests are generated may depend on the bus-usage efficiency indicator and/or the bus-bandwidth usage indicator generated by the requester.

When a requester is in no-speculation state 306, the requester engages in no speculation generating bus requests when the requestor is ready to use the bus. In other words, in no-speculation state 306, bus requests are not generated ahead-of-time and the data is available in the buffer before the transaction starts.

In accordance with some embodiments, when a requester receives a bus-activity indicator from a bus arbiter indicating that the system bus is busy, the requester may go into one of the speculation states, such as full-speculation state 302. A bus-activity indicator may be broadcast by the arbiter on a regular basis, such as every 1000 bus cycles, or may be broadcast when the bus activity changes.

During a speculation state, such as full-speculation state 302, a requestor may measure its recent bus usage and generate the bus-usage efficiency indicator the bus-bandwidth usage indicator. The bus-usage efficiency indicator may be based on a number of unused bus cycles that were granted to the requestor during a prior observation window. The bus-bandwidth usage indicator may be based on a number of bus transactions utilized by the requestor during the prior observation window. As indicated by transition 308, when the bus-usage efficiency is low, the requester may transition from full-speculation state 302 to delayed-speculation state 304. This is because of the causal link between predictive requesting and data availability. The more aggressive the requesting algorithm, the more likely it may be that data is not available to complete a transaction. Efficiency is a proxy for data availability, and when the efficiency is low, the prediction algorithm may be relaxed in an effort to reduce the wasted cycles.

During delayed-speculation state 304, the requester may measure its bus usage and generate a bus-usage efficiency indicator the bus-bandwidth usage indicator. As indicated by transition 310, when the bus-usage efficiency is high, and the bandwidth usage (e.g., BWu) measured during delayed-speculation state 304 is less than the bandwidth usage measured during full-speculation state 302, the requestor may transition from delayed-speculation state 304 to full-speculation state 302. This is because efficiency may not be a complete measure of bus optimization. Due to the nature of a bus, such as a PCI bus and most other buses, it is possible to achieve higher efficiencies without getting useful transactions (e.g., in the case with retries). The bandwidth usage is a failsafe which helps improve some of these situations.

As indicated by transition 312, a requester may transition from delayed-speculation state 304 to non-speculation state 305 when the bus-usage efficiency is low or remains low. During no-speculation state 306, the requestor may measure its bus usage and generate a bus-usage efficiency indicator the bus-bandwidth usage indicator. As indicated by transition 314, when the bus-usage efficiency is high, and the bandwidth usage (e.g., BWu) measured during no-speculation state 306 is less than the bandwidth usage measured during delayed-speculation state 304, the requester may transition from no-speculation state 306 to delayed-speculation state 304.

As indicated by transition 316, when the bus-usage efficiency is high, and the bandwidth usage (e.g., BWu) measured during no-speculation state 306 is less than the bandwidth usage measured during full-speculation state 302, the requestor may transition from no-speculation state 306 to full-speculation state 302. In some embodiments, transition 316 may be performed when user programmability may bar transition 314.

In some embodiments, the requestor may remain in full-speculation state 302 as long as the bus-usage efficiency is high. In general, a requester may determine and operate in a particular speculation state for a given bus-activity indicator and may remain in that speculation state until the bus-activity indicator changes, which may occur after each system-bus observation window.

In some embodiments, user settings may disallow certain speculation states and associated transactions. For example, in some embodiments, transition 318 from full-speculation state 302 to no-speculation state 306 may occur when user programmability bars transition 308. User programmability, including settings and selections, may be provided through an I/O device, such as I/O 122 (FIG. 1). In some embodiments, master bits may be available to turn off speculation or introduce fixed delays in the request pipeline. As a result, a desired speculation mode may result that may be appropriate for the prevailing traffic pattern on the system bus. For enhanced performance, the traffic patterns may remain fairly stable over lengths of time much greater than the system-bus observation window. In some embodiments, changes in traffic patterns may reset the speculation state back to full-speculation state 302, which may be a default state.

In some embodiments, a requestor may further determine a number of bus cycles to generate the bus request ahead-of-time based on an imminence level of a transaction for which the bus request is to be generated. In these embodiments, an imminence bit may be set. In some embodiments, memory controller 104 (FIG. 1), as one of requestors 106A, 106B and 106C (FIG. 1), may be coupled to various memories 105 (FIG. 1), which may include off-chip memory. Memory controller 104 (FIG. 1) may make an independent decision on whether there is need to request use of bus 114 (FIG. 1) to service an outstanding transaction, and may base this decision on whether the transaction is considered imminent. Transactions may be considered imminent when they reach a predetermined state of completion. In some embodiments, a requestor, such as memory controller 104 (FIG. 1), may determine the existence of a need for a bus request and may proceed to implement the request in accordance with the speculation state.

For example, bus requests for a variable-latency input-output (VLIO) memory, such as command chips and card memory, are generally not considered imminent because the data arrival may be unpredictable. Bus requests for synchronous memory, for example, may be considered imminent when the transaction length exceeds a certain number of bytes (such as 16) or a predetermined percentage of bites (e.g., 16 out of 32) has been received. In some embodiments, the transfer may be considered imminent upon receipt of the $16^{th}$ byte. Bus requests for synchronous memory for transfers less than 16 bytes may be considered imminent and may have their imminence bit set when the transfer is initiated. For transactions involving other memory types (e.g., SRAM, FLASH), an imminence bit may be set upon the arrival of the last_but_one beat of data from an external source. In these embodiments, data may arrive in beats from an external memory chip. The size of the beat relates to the number of wires connected to the chip (e.g., 8, 16, 32, 64, etc.). Thus, it will take 16 beats to fetch 32 bytes from a memory over 16 wires, for example. In this case, the imminence bit may be set upon the arrival of the 15th beat (e.g., the last_but_one beat of data).

Figure 4:
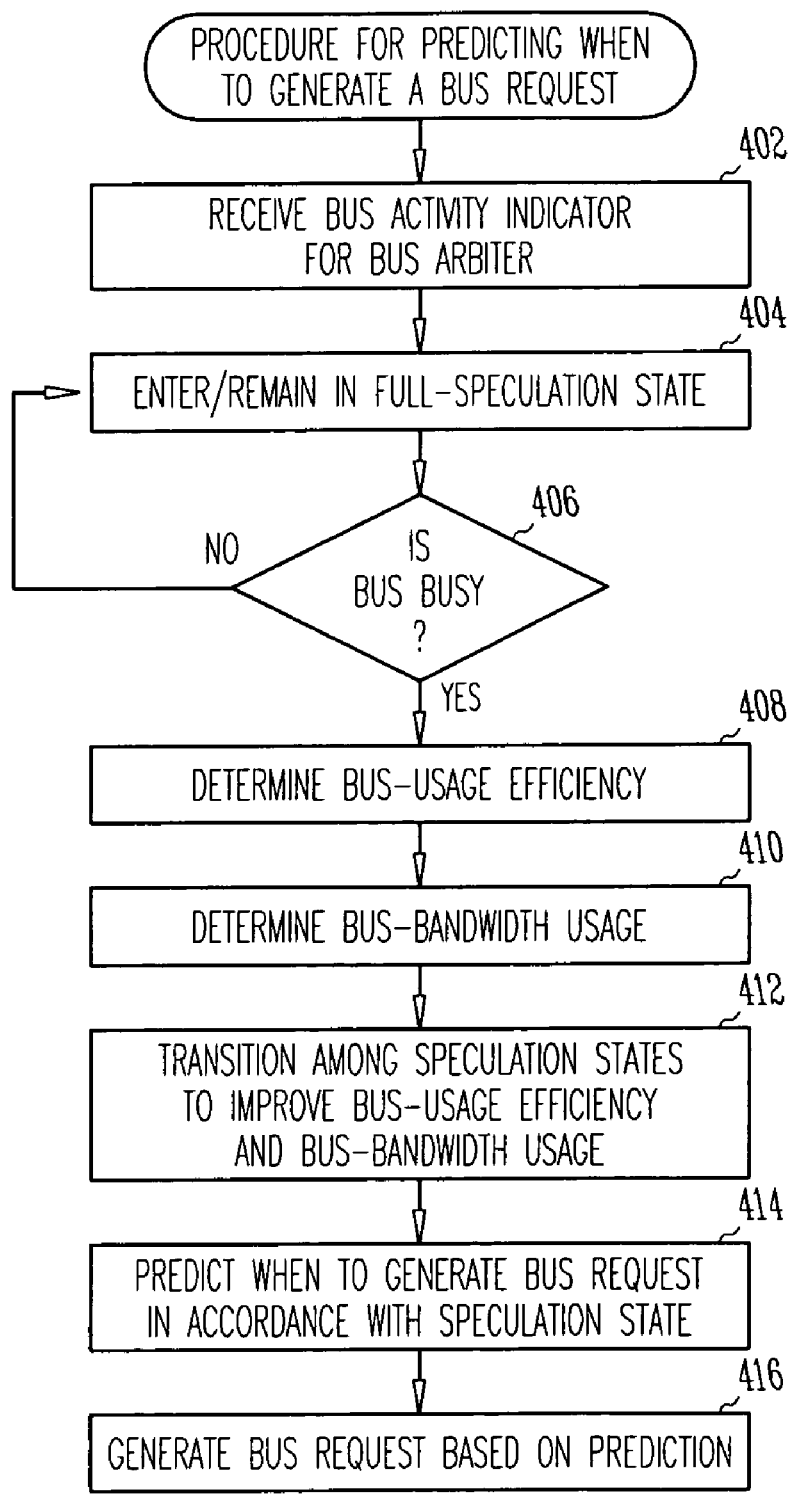
FIG. 4 is a procedure for predicting when to generate a bus request in accordance with some embodiments of the present invention.

FIG. 4 is a procedure for predicting when to generate a bus request in accordance with some embodiments of the present invention. Procedure 400 may be performed by a requestor, such as one of requestors 106A, 106B and 106C (FIG. 1) although other system elements may also perform procedure 400.

In operation 402, a bus-activity indicator, such as bus-activity indicator 120 (FIG. 1), is received from a bus arbiter. The bus arbiter may generate the bus-activity indicator based on system bus activity and may be broadcast to one or more of requestors 106A, 106B and 106C (FIG. 1). In some embodiments, the bus-activity indicator may indicate whether the system bus is busy or idle.

In operation 404, a requestor may enter an initial speculation state, such as full-speculation state 302 (FIG. 3). Operation 406 determines when the bus-activity indicator indicates that the system bus has been busy during a prior observation window. When operation 406 determines that the system bus is not busy, or idle, operation 404 is repeated and the requestor may remain in the full-speculation state. When operation 406 determines that the system bus is busy, operation 408 is performed.

In operation 408, the requestor determines the bus-usage efficiency for the requester, and in operation 410, the requestor determines the bus-bandwidth usage for the requestor. In operation 412, the requester may transition among the various speculation states, such as speculation states 302, 304 and 306 (FIG. 3) as described above depending on the bus-usage efficiency and bus-bandwidth usage, which may be measured and determined after a transition between states. In some embodiments, a requester may remain in one of the speculation states until the bus-activity indicator changes. The speculation state may depend on the bus-activity indicator, as well as the bus-usage efficiency and the bus-bandwidth usage.

In operation 414, the requester may predict when to generate a bus request depending on its speculation state. In some embodiments, the requestor may predict when to generate a bus request depending on the bus-usage efficiency and the bus-bandwidth usage. In operation 416, the requestor generates the bus request based on the prediction generated in operation 414. In some embodiments, the requester generates the bus request based on an imminence level of the transaction discussed above.

Accordingly, the use of speculation states may help reduce the effects of latency and increase bus-usage efficiency. Although the individual operations of procedure 400 are illustrated and described as separate operations, one or more of the individual operations may be performed concurrently and nothing requires that the operations be performed in the order illustrated.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method comprising predicting when to generate a bus request based on either unused bus cycles that were granted to a requestor or a number of bus transactions utilized by the requestor.

2. The method of claim 1 further comprising generating the bus request ahead-of-time based on the predicting.

3. The method of claim 2 further comprising receiving a bus-activity indicator from a bus arbiter indicating system bus activity during a prior system-bus observation window, and
wherein predicting further comprises predicting when to generate the bus request ahead-of-time based on the bus-activity indicator.

4. The method of claim 3 wherein when the bus-activity indicator indicates that the system bus is busy, predicting comprises predicting how early to generate the bus request ahead-of-time based on the bus-activity indicator, a bus-usage efficiency indicator and a bus-bandwidth usage indicator.

5. The method of claim 1 wherein at least one of a plurality of requestors generate bus requests ahead-of-time based on the predicting, wherein the requestors comprise one or more of a memory controller, a direct memory access unit, a network interface, a digital signal processors, a network controller, a wireless local area network controller, a signal processor, a floating-point unit, application accelerators, or a data acquisition device.

6. A method of predicting when to generate a bus request based on bus-usage efficiency and bus-bandwidth usage comprising:
generating a bus-usage efficiency indicator by a requestor based on unused bus cycles that were granted to the requestor; and
generating a bus-bandwidth usage indicator by the requestor based on a number of bus transactions utilized by the requestor.

7. A method comprising:
predicting when to generate a bus request based on bus-usage efficiency and bus-bandwidth usage;
generating the bus request ahead-of-time based on the predicting; and
receiving a bus-activity indicator from a bus arbiter indicating system bus activity during a prior system-bus observation window,
wherein predicting further comprises predicting when to generate the bus request ahead-of-time based on the bus-activity indicator, and
wherein when the bus-activity indicator indicates that the system bus is not busy, the method further comprises engaging in full speculation to generate the bus request ahead-of-time at a maximum predetermined number of bus cycles.

8. A method comprising:
predicting when to generate a bus request based on bus-usage efficiency and bus-bandwidth usage;
generating the bus request ahead-of-time based on the predicting; and
receiving a bus-activity indicator from a bus arbiter indicating system bus activity during a prior system-bus observation window,
wherein predicting further comprises predicting when to generate the bus request ahead-of-time based on the bus-activity indicator,
wherein when the bus-activity indicator indicates that the system bus is busy, predicting comprises predicting how early to generate the bus request ahead-of-time based on the bus-activity indicator, a bus-usage efficiency indicator and a bus-bandwidth usage indicator, and
wherein predicting further comprises predicting when to generate the bus request based on one of a plurality of speculation states at least initially determined by the bus-activity indicator, and the method further comprises transitioning among the speculation states based on the bus-usage efficiency indicator and the bus-bandwidth usage indicator.

9. A method comprising:
predicting when to generate a bus request based on bus-usage efficiency and bus-bandwidth usage;
generating the bus request ahead-of-time based on the predicting; and
receiving a bus-activity indicator from a bus arbiter indicating system bus activity during a prior system-bus observation window,
wherein predicting further comprises predicting when to generate the bus request ahead-of-time based on the bus-activity indicator, and
wherein generating further comprises generating the bus request a number of bus cycles ahead-of-time based on an imminence level of a transaction for the bus request.

10. A method comprising:
predicting when to generate a bus request based on bus-usage efficiency and bus-bandwidth usage;
generating the bus request ahead-of-time based on the predicting; and
receiving a bus-activity indicator from a bus arbiter indicating system bus activity during a prior system-bus observation window,
wherein predicting further comprises predicting when to generate the bus request ahead-of-time based on the bus-activity indicator, and
wherein the bus-activity indicator is generated by a bus arbiter and indicates whether or not the system bus is busy based on a number of requests during a system-bus observation window, the system-bus observation window comprising a prior predetermined number of system-bus cycles.

11. A method comprising:
predicting when to generate a bus request based on bus-usage efficiency and bus-bandwidth usage;
generating the bus request ahead-of-time based on the predicting; and
receiving a bus-activity indicator from a bus arbiter indicating system bus activity during a prior system-bus observation window,
wherein predicting further comprises predicting when to generate the bus request ahead-of-time based on the bus-activity indicator, and
wherein the bus-activity indicator is generated by a bus arbiter and comprises a two-bit value broadcasted by the bus arbiter to one or more requestors of the system.

12. A memory controller comprising:
first logic circuitry to generate one or more indicators based on either unused bus cycles that were granted to a requestor or a number of bus transactions utilized by the requestor; and
second logic circuitry to predict when to generate a bus request based on one of the indicators.

13. A memory controller comprising:
first logic circuitry to generate a bus-usage efficiency indicator and a bus-bandwidth usage indicator; and
second logic circuitry to predict when to generate a bus request based on the bus-usage efficiency indicator and the bus-bandwidth usage indicator,
wherein the first logic circuitry generates the bus-usage efficiency indicator based on unused bus cycles that were granted to the memory controller during a prior observation window, and generates the bus-bandwidth usage indicator based on a number of bus transactions utilized by the memory controller during the prior observation window.

14. The memory controller of claim 13 further comprising third logic circuitry to generate the bus request ahead-of-time based on the prediction.

15. The memory controller of claim 14 wherein the second logic circuitry receives a bus-activity indicator from a bus arbiter indicating system bus activity during a system-bus observation window and predicts when to generate the bus request ahead-of-time based on the bus-activity indicator.

16. The memory controller of claim 15 wherein when the bus-activity indicator indicates that the system bus is not busy, the memory controller engages in full speculation and generates the bus request ahead-of-time by a maximum predetermined number of bus cycles.

17. The memory controller of claim 15 wherein when the bus-activity indicator indicates that the system bus is busy, the second logic circuitry predicts how early to generate the bus request based on the bus-activity indicator, the bus-usage efficiency indicator and the bus-bandwidth usage indicator.

18. The memory controller of claim 17 wherein the second logic circuitry predicts when to generate the bus request based on one of a plurality of speculation states at least initially determined by the bus-activity indicator, the memory controller to transition among the speculation states based on the bus-usage efficiency indicator and the bus-bandwidth usage indicator.

19. The memory controller of claim 15 wherein the second logic circuitry determines a number of bus cycles to generate the bus request ahead-of-time further based on an imminence level of a transaction for which the bus request is to be generated.

20. A processing system comprising:
an arbiter to generate a bus-activity indicator indicating activity of a system bus during a prior system-bus observation window; and
a memory controller to predict when to generate a bus request based on the bus-activity indicator and based on either unused bus cycles that were granted to a requestor or a number of bus transactions utilized by the requestor, the memory controller to generate the bus request ahead-of-time based on the prediction.

21. A processing system comprising:
an arbiter to generate a bus-activity indicator indicating activity of a system bus activity during a prior system-bus observation window;
a memory controller to predict when to generate a bus request based on the bus-activity indicator, a bus-usage efficiency indicator and a bus-bandwidth usage indicator and to generate the bus request ahead-of-time based on the prediction; and
synchronous memory coupled to the memory controller, wherein the memory controller generates the bus-usage efficiency indicator based on unused bus cycles that were granted to the memory controller, and generates the bus-bandwidth usage indicator based on bus transactions utilized by the memory controller during a prior observation window.

22. The processing system of claim 21 wherein when the bus-activity indicator indicates that the system bus is not busy, the memory controller engages in full speculation to generate the bus request ahead-of-time at a maximum predetermined number of bus cycles, and wherein when the bus-activity indicator indicates that the system bus is busy, the memory controller predicts how early to generate the bus request based on the bus-activity indicator, the bus-usage efficiency indicator and the bus-bandwidth usage indicator.

23. The processing system of claim 22 wherein the memory controller predicts when to generate the bus request based on one of a plurality of speculation states at least initially determined by the bus-activity indicator, the memory controller transitions among the speculation states based on the bus-usage efficiency indicator and the bus-bandwidth usage indicator.

24. A wireless communication device comprising:
a wireless network interface to provide wireless communications within a wireless network, the network interface coupled to a system bus; and
a requestor to predict when to generate a bus request for use of the system bus based on a bus-activity indicator, a bus-usage efficiency indicator and a bus-bandwidth usage indicator and to generate the bus request ahead-of-time based on the prediction.

25. The device of claim 24 further comprising an antenna coupled to the network interface to receive and transmit the wireless communications with the network, and
wherein the requestor generates the bus-usage efficiency indicator based on unused bus cycles that were granted to the requestor, and generates the bus-bandwidth usage indicator based on bus transactions utilized by the requestor during a prior observation window,
wherein the device further comprises an arbiter to generate the bus-activity indicator indicating activity of the system bus activity during a prior system-bus observation window.

26. The device of claim 25 wherein when the bus-activity indicator indicates that the system bus is not busy, the requestor engages in full speculation to generate the bus request ahead-of-time at a maximum predetermined number of bus cycles,
wherein when the bus-activity indicator indicates that the system bus is busy, the requestor predicts how early to generate the bus request based on the bus-activity indicator, the bus-usage efficiency indicator and the bus-bandwidth usage indicator, and
wherein the requestor predicts when to generate the bus request based on one of a plurality of speculation states at least initially determined by the bus-activity indicator, the requestor transitions among the speculation states based on the bus-usage efficiency indicator and the bus-bandwidth usage indicator.

27. The device of claim 25 wherein the requestor and the wireless network interface are two of a plurality of requestors desiring access to one or more shared resources,
wherein the wireless network interface predicts when to generate a bus request based on the bus-activity indicator, a bus-usage efficiency indicator and a bus-bandwidth usage indicator, and
wherein the wireless network interface generates the bus request ahead-of-time based on the prediction.

28. An article comprising a storage medium having stored thereon instructions, that when executed by a computing platform, result in predicting when to generate a bus request based on either unused bus cycles that were granted to a requestor or a number of bus transactions utilized by the requestor.

29. An article comprising a storage medium having stored thereon instructions, that when executed by a computing platform, result in predicting when to generate a bus request based on bus-usage efficiency and bus-bandwidth usage.

wherein the instructions, when further executed by the computing platform result in:

generating a bus-usage efficiency indicator by a requestor based on unused bus cycles that were granted to the requestor; and generating a bus-bandwidth usage indicator by the requestor based on a number of bus transactions utilized by the requestor.

30. The article of claim 29 wherein the instructions, when further executed by the computing platform result in:

receiving a bus-activity indicator from a bus arbiter indicating system bus activity during a prior system-bus observation window, and wherein predicting further comprises predicting when to generate the bus request ahead-of-time based on the bus-activity indicator, wherein when the bus-activity indicator indicates that the system bus is not busy, the instructions result in engaging in full speculation to generate the bus request ahead-of-time at a maximum predetermined number of bus cycles.

* * * * *

UNITED STATES PATENT AND TRADEMARK OFFICE
CERTIFICATE OF CORRECTION

PATENT NO. : 7,099,968 B2 Page 1 of 1
APPLICATION NO. : 10/654544
DATED : August 29, 2006
INVENTOR(S) : Rengarajan It is certified that error appears in the above-identified patent and that said Letters Patent is hereby corrected as shown below:

On the title page, in field (57), under "Abstract", in column 2, line 4, delete "requester," and insert -- requestor, --, therefor.

On the title page, in field (57), under "Abstract", in column 2, line 6, delete "requester" and insert -- requestor --, therefor.

On the title page, in field (57), under "Abstract", in column 2, line 8, delete "requester" and insert -- requestor --, therefor.

On the title page, in field (57), under "Abstract", in column 2, line 9, delete "requester" and insert -- requestor --, therefor.

On the title page, in field (57), under "Abstract", in column 2, line 17, delete "requester" and insert -- requestor --, therefor.

In column 13, line 2, in Claim 29, after "usage" delete "." and insert -- , --, therefor.

Signed and Sealed this

Twenty-sixth Day of December, 2006

JON W. DUDAS
*Director of the United States Patent and Trademark Office*